(12) United States Patent
Yoshida et al.

(10) Patent No.: US 10,747,972 B2
(45) Date of Patent: Aug. 18, 2020

(54) TAG COMMUNICATION DEVICE, CONTROL METHOD THEREOF, AND CONTROL PROGRAM

(71) Applicant: OMRON Corporation, Kyoto (JP)

(72) Inventors: Tatsuo Yoshida, Kyoto (JP); Hiroaki Motoshima, Kyoto (JP); Shuichi Matsui, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/352,851

(22) Filed: Mar. 14, 2019

(65) Prior Publication Data
US 2019/0325179 A1    Oct. 24, 2019

(30) Foreign Application Priority Data

Apr. 23, 2018 (JP) ................. 2018-082279

(51) Int. Cl.
*G06K 7/10* (2006.01)
*G06K 7/00* (2006.01)
(Continued)

(52) U.S. Cl.
CPC ....... *G06K 7/10415* (2013.01); *G06K 7/0008* (2013.01); *G06K 19/0723* (2013.01); *H04Q 9/00* (2013.01); *H04Q 2209/47* (2013.01)

(58) Field of Classification Search
CPC ............. G06K 19/0723; G06K 7/0008; G06K 7/10079; G06K 7/10128; G06K 7/10415; H04Q 2209/47; H04Q 9/00
See application file for complete search history.

(56) References Cited

U.S. PATENT DOCUMENTS 7,233,250 B2 * 6/2007 Forster ............... G06K 19/0723
340/572.8
2008/0220721 A1 * 9/2008 Downie .................. G02B 6/38
455/41.3
(Continued)

FOREIGN PATENT DOCUMENTS

JP    2011067077    3/2011
JP    2012098863    5/2012
WO    2010103972    9/2010

OTHER PUBLICATIONS

"Search Report of Europe Counterpart Application", dated Sep. 10, 2019, pp. 1-7.

*Primary Examiner* — Sisay Yacob
(74) *Attorney, Agent, or Firm* — JCIPRNET

(57) ABSTRACT

Provided is a tag communication device performing wireless communication with an RFID tag including a light emitting unit. The tag communication device includes a communication unit, an imaging unit, and a control unit. The control unit (i) acquires tag IDs of one or more RFID tags present in a communicable range of the communication unit, (ii) transmits a light emission instruction to at least some of the RFID tags corresponding to the acquired tag IDs, (iii) measures a distance between the imaging unit and a position where the light emitting unit emits light based on the light emission instruction on the basis of imaging information of the imaging unit, and (iv) performs a predetermined operation on the RFID tag to which the light emission instruction is transmitted, in a case where it is determined that the distance is within a predetermined range.

19 Claims, 9 Drawing Sheets

(51) Int. Cl.
*G06K 19/07* (2006.01)
*H04Q 9/00* (2006.01)

(56) References Cited

U.S. PATENT DOCUMENTS

| | | | | |
|---|---|---|---|---|
| 2009/0167495 A1* | 7/2009 | Smith | ............. | G06K 19/07703 340/10.1 |
| 2012/0105210 A1* | 5/2012 | Smith | ............. | G06K 19/07703 340/10.1 |
| 2017/0337792 A1* | 11/2017 | Bermudez Rodriguez | ................. | G06Q 10/087 |

* cited by examiner

| | RSSI | Tag ID |
|---|---|---|
| PRODUCTION LINE A RSSI: −15〜−25 | −20 | 0005 |
| | −25 | 0002 |
| | −40 | 0000 |
| PRODUCTION LINE B RSSI: −45〜−55 | −50 | 0008 |
| | −55 | 0001 |
| PRODUCTION LINE C RSSI: −60〜−70 | −60 | 0007 |
| | −65 | 0003 |
| | −75 | 0009 |

FIG. 9

TAG COMMUNICATION DEVICE, CONTROL METHOD THEREOF, AND CONTROL PROGRAM

CROSS-REFERENCE TO RELATED APPLICATION

This application claims the priority of Japan patent application serial no. 2018-082279, filed on Apr. 23, 2018. The entirety of the above-mentioned patent application is hereby incorporated by reference herein and made a part of this specification.

BACKGROUND

Technical Field

The present disclosure relates to a tag communication device performing wireless communication with an RFID tag including a light emitting unit, a control method thereof, and a control program.

Description of Related Art

A radio frequency identification (RFID) technique is a technique for communicating with an RFID tag in a wireless manner, reading out information on the RFID tag, and writing information in the RFID tag, and is used in various industrial fields. An example thereof is application to commodities on a production line. That is, an RFID tag is attached to each commodity on a production line, and the progress of various production processes is monitored and managed on the basis of information stored in the RFID tag.

In such an application example, a technique for accurately identifying a moving RFID tag has become important in order to perform an operation on an RFID tag present at a specific position. In this regard, Patent Document 1 (Japanese Patent Laid-Open No. 2012-098863 (published on May 24, 2012)) discloses an RFID system capable of communicating with only an RFID tag required to recognize a moving object through a simple configuration and simple processing.

However, in the above-described related art, a distance is measured on the basis of only an electromagnetic wave signal, and thus the inventors have found that there are the following problems. Since an electromagnetic wave signal may be reflected by surrounding objects, a distance measured on the basis of the intensity of the electromagnetic wave signal emitted by an RFID tag may not be accurate. Therefore, there is a possibility that it may not be possible to perform an operation on an RFID tag present at a specific position.

SUMMARY

The disclosure provides a tag communication device capable of more accurately performing an operation on an RFID tag present at a specific position.

The disclosure provides a tag communication device performing wireless communication with a radio frequency identifier (RFID) tag including a light emitting unit, the tag communication device including a communication unit that performs wireless communication with the RFID tag, an imaging unit that images at least a portion of a communicable range of the communication unit, and a control unit, in which the control unit performs an acquisition process of acquiring tag identifications (IDs) of one or more RFID tags, which are present in the communicable range of the communication unit, through the communication unit, a transmission process of transmitting a light emission instruction to at least some of the RFID tags corresponding to the acquired tag IDs through the communication unit, a measurement process of measuring a distance between the imaging unit and a position where the light emitting unit emits light based on the light emission instruction, on the basis of imaging information of the imaging unit, and an operation process of performing a predetermined operation on an RFID tag to which the light emission instruction is transmitted through the communication unit in a case where it is determined that the distance is within a predetermined range.

The disclosure also provides a method of controlling a tag communication device including a communication unit and an imaging unit and performing wireless communication with an RFID tag including a light emitting unit, in which the communication unit performs wireless communication with the RFID tag, and the imaging unit images at least a portion of a communicable range of the communication unit, and the method includes (i) an acquisition step of acquiring tag IDs of one or more RFID tags, which are present in the communicable range of the communication unit, through the communication unit, (ii) a transmission step of transmitting a light emission instruction to at least some of the RFID tags corresponding to the acquired tag IDs through the communication unit, (iii) a measurement step of measuring a distance between the imaging unit and a position where the light emitting unit emits light based on the light emission instruction, on the basis of imaging information of the imaging unit, and (iv) an operation step of performing a predetermined operation on an RFID tag to which the light emission instruction is transmitted through the communication unit in a case where it is determined that the distance is within a predetermined range.

BRIEF DESCRIPTION OF THE DRAWINGS

FIG. 9 illustrates an example of a data configuration referred to by a tag communication device in a modification example (4-4) of the disclosure.

DESCRIPTION OF THE EMBODIMENTS

Figure 1:
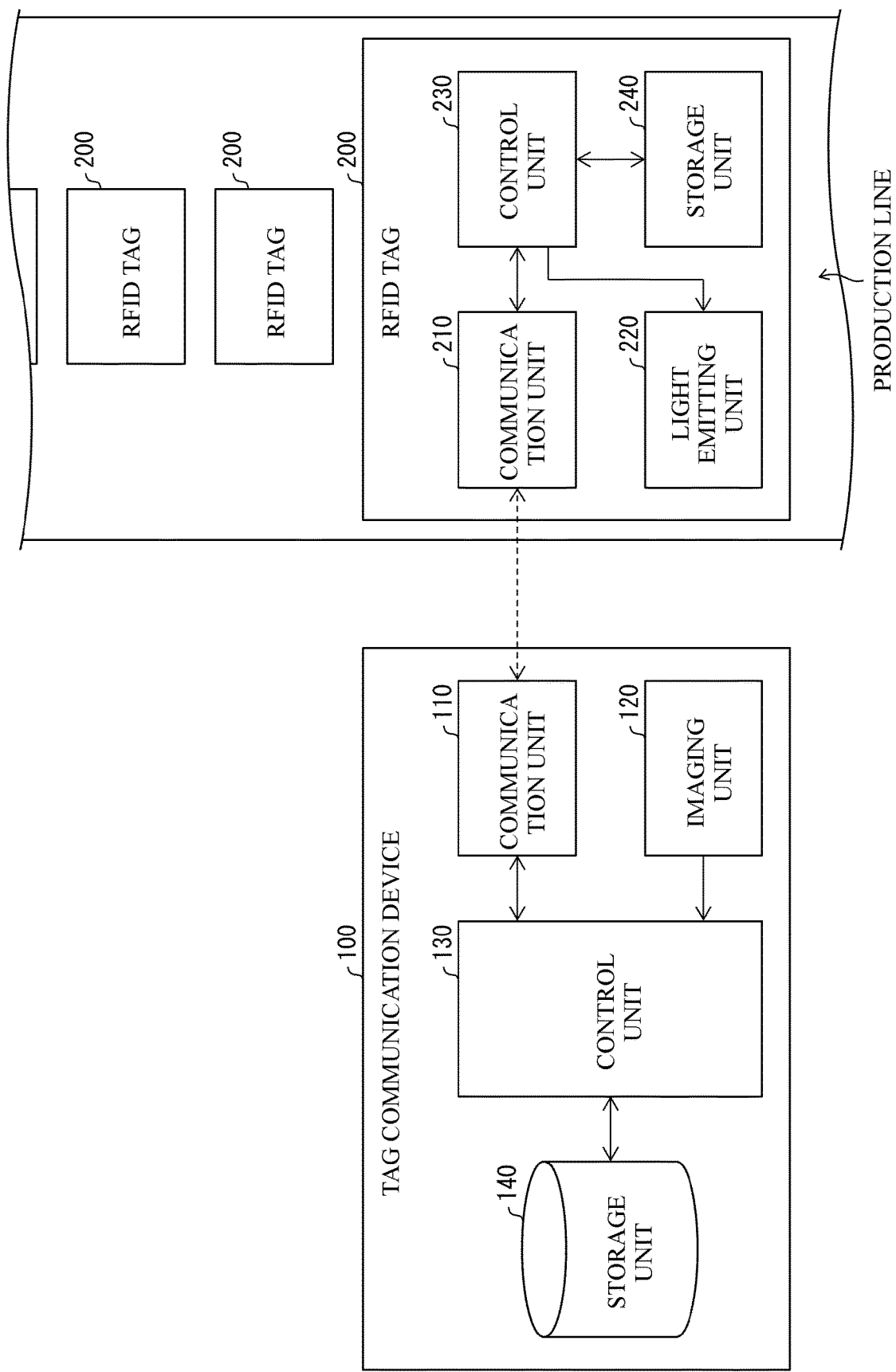
FIG. 1 is an illustrative outline drawing of a tag communication system in an embodiment according to an embodiment of the disclosure.

According to the above-described configuration, the tag communication device transmits a light emission instruction to an RFID tag and performs a predetermined operation on the RFID tag in a case where it is determined that the RFID tag emitting light is within a predetermined distance range from the imaging unit on the basis of the light emission instruction. That is, the tag communication device also uses information regarding a distance acquired by the imaging unit other than an electromagnetic wave signal emitted by an RFID tag when identifying the RFID tag. As a result, the tag communication device can more accurately perform an operation on an RFID tag present at a specific position.

Note that "a radio frequency identification (RFID) tag" mentioned in this specification generally refers to an information medium reading and writing information stored in a built-in memory in a non-contact manner by using electromagnetic waves. A tag communication device (reader/writer) is used when reading and writing information regarding an RFID tag. Names such as "an RF tag", "an electronic tag", "an IC tag", and "a wireless tag" may be used for an RFID tag. In addition, an RFID tag in this specification includes both a passive tag and an active tag, and also includes a non-contact IC card mainly carried by a person.

According to the embodiment, the control unit sets two or more sub-ranges within the predetermined range in the operation process, and performs a different operation on the RFID tag to which the light emission instruction is transmitted depending on in which sub-range the distance between the imaging unit and the position where the light emitting unit emits light based on the light emission instruction is included, in the operation process.

According to the above-described configuration, the tag communication device can determine whether or not an RFID tag has emitted light, with respect to two or more regions having different distances from the imaging unit (for example, on a production line A and on a production line B). In addition, the tag communication device can perform a different operation depending on the position of an RFID tag. As a specific example, the tag communication device can write different pieces of information in an RFID tag flowing through the production line A and an RFID tag flowing through the production line B.

According to the embodiment, the control unit measures the distance between the imaging unit and the position where the light emitting unit emits light based on the light emission instruction, on the basis of a size of the light emitting unit in an image acquired by the imaging unit in the measurement process.

According to the above-described configuration, the tag communication device can more accurately measure a distance between the imaging unit and an RFID tag. For this reason, it is possible to more accurately perform an operation on an RFID tag present at a specific position.

According to the embodiment, the imaging unit is a stereo camera, and the control unit measures the distance between the imaging unit and the position where the light emitting unit emits light based on the light emission instruction, on the basis of a plurality of parallax images acquired by the imaging unit in the measurement process.

According to the above-described configuration, the tag communication device can more accurately measure a distance between the imaging unit and an RFID tag. For this reason, it is possible to more accurately perform an operation on an RFID tag present at a specific position.

According to the embodiment, the control unit preferentially transmits a light emission instruction to an RFID tag in which an intensity of an electromagnetic wave signal is within a predetermined range, among the RFID tags corresponding to the acquired tag IDs in the transmission process.

According to the above-described configuration, the tag device can preferentially transmit a light emission instruction to an RFID tag (for example, an RFID tag on a specific line) which is estimated to have a positional relationship of being close to a target distance when a plurality of tag IDs are acquired. For this reason, it is possible to increase a processing speed of the tag device.

According to the embodiment, the control unit may transmit a light emission instruction so as to make two or more RFID tags emit light at different timings in a case where the light emission instruction is transmitted to two or more RFID tags in the transmission process.

According to the above-described configuration, RFID tags emit light at different timings. For this reason, the tag communication device can more accurately identify which RFID tag has emitted light on the basis of a light emission instruction.

According to the embodiment, in a case where (i) tag IDs of two or more RFID tags are acquired and (ii) it is determined that the distance is within the predetermined range with respect to one RFID tag among the two or more RFID tags in the operation process, the control unit continuously transmits a light emission instruction to the remaining RFID tags among the two or more RFID tags in the transmission process.

According to the above-described configuration, the tag communication device can detect light emitted from a plurality of RFID tags. For this reason, the tag communication device can perform a predetermined operation on the plurality of RFID tags.

According to the embodiment, the predetermined operation in the operation process is at least one of the following (i) and (ii): (i) reading out information from the RFID tag with respect to the RFID tag to which the light emission instruction is transmitted, and (ii) writing information in the RFID tag with respect to the RFID tag to which the light emission instruction is transmitted.

According to the above-described configuration, the tag communication device can read and write information from and in an RFID tag.

Note that the tag communication device may be realized by a computer, and in this case, a tag communication device control program causing the computer to operate as each means described above to realize the tag communication device using the computer, and a computer-readable recording medium having the tag communication device control program recorded thereon also falls within the scope of the disclosure.

According to an embodiment of the disclosure, a tag communication device capable of more accurately performing an operation on an RFID tag present at a specific position is provided.

Hereinafter, an embodiment of the disclosure (hereinafter, also referred to as "the present embodiment") will be described with reference to the accompanying drawings. Note that, data appearing in the present embodiment may be described in a natural language, and more specifically, be designated in a pseudo language, commands, parameters, a machine language, or the like which is recognizable by a computer.

Note that, in this specification, description will be given on the basis of an example in which the disclosure is applied to a production line. However, it should be understood that configurations of the disclosure described in the claims can be applied to various industrial fields in addition to production lines.

§ 1 Application Example

An example of a scenario to which the disclosure is applied will be described on the basis of FIG. 1. FIG. 1 schematically illustrates an example of a tag communication system including a tag communication device 100 according to the present embodiment. The tag communication device 100 performs an operation on an RFID tag 200 on a production line through wireless communication (this wireless communication is performed through communication units 110 and 210). An example of the operation performed on the RFID tag 200 by the tag communication device 100 is the reading and writing of information stored in a storage unit 240 of the RFID tag 200.

In the present embodiment, a control unit 130 of the tag communication device 100 causes a light emitting unit 220 included in the RFID tag 200 to emit light. In addition, the control unit 130 measures a distance between a position where the light emitting unit 220 emits light and an imaging unit 120 (that is, a distance between the RFID tag 200 and the imaging unit 120). As a result, the tag communication device 100 specifies a distance between the RFID tag 200 and the imaging unit 120 on the basis of an electromagnetic wave signal and an optical signal, and thus it is possible to more accurately specify the distance. For this reason, it is possible to more accurately perform an operation on the RFID tag 200 present at a specific position.

Figure 2:
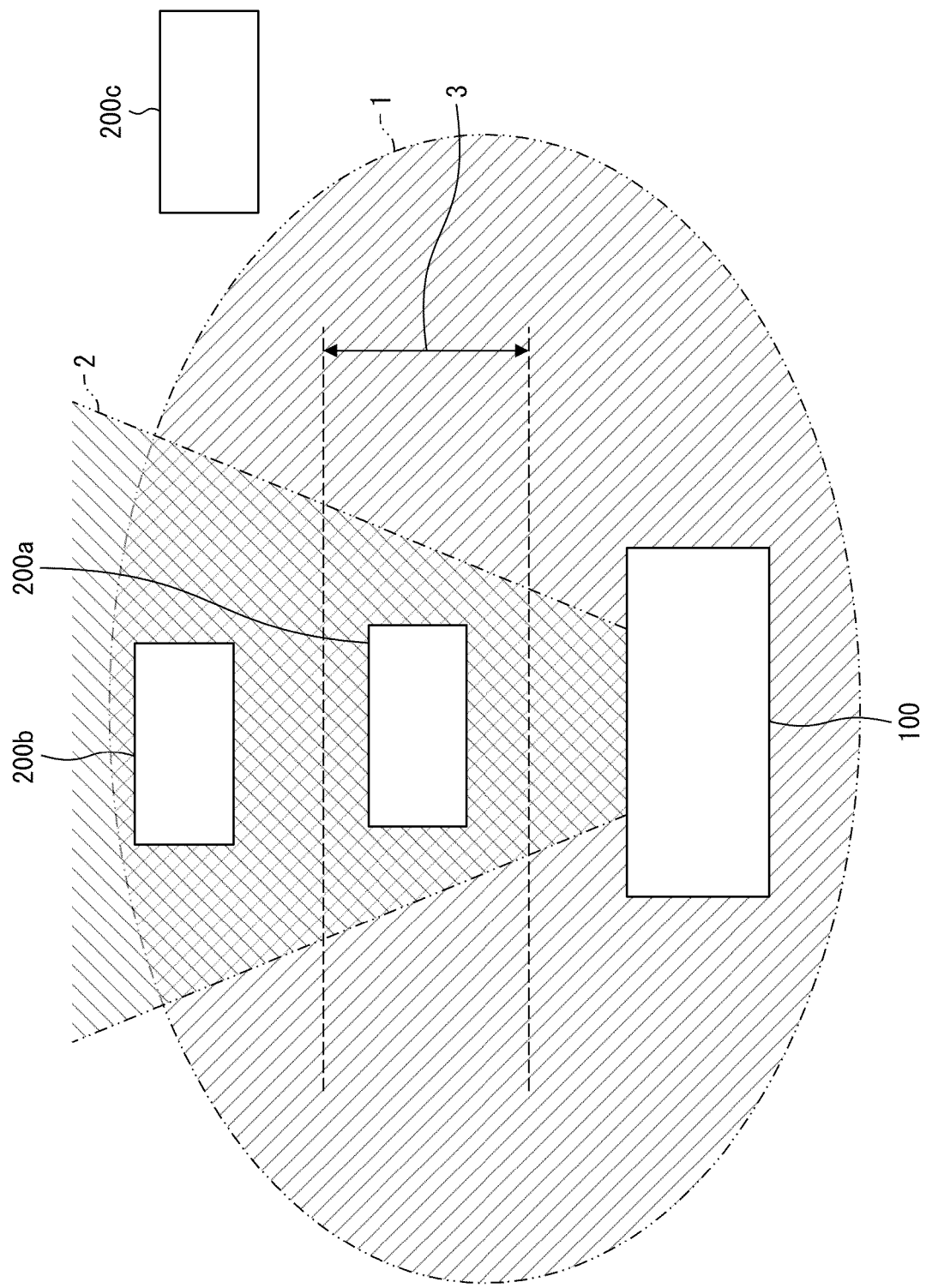
FIG. 2 is a schematic view illustrating a relationship between a communicable range of a communication unit and an imaging region of an imaging unit of a tag communication device in the embodiment according to the embodiment of the disclosure.

A relationship between a communicable range of the communication unit 110 and an imaging region of the imaging unit 120 will be described on the basis of FIG. 2. In FIG. 2, the communication unit 110 can communicate with RFID tags 200a and 200b within a communicable range 1 among the RFID tags 200a to 200c. Similarly, the RFID tags 200a and 200b are present within an imaging region 2 of the imaging unit 120, and thus the tag communication device 100 can measure a distance between the imaging unit 120 and the light emitting unit 220 with respect to the RFID tags 200a and 200b. In a positional relationship of FIG. 2, the RFID tag 200a is present within a predetermined distance range 3 from the tag communication device 100, but the RFID tag 200b is not present within the predetermined distance range 3 from the tag communication device 100.

The tag communication device 100 can perform an operation on only the RFID tag 200a present within the predetermined distance range 3 from the tag communication device 100 in the communicable range 1 of the communication unit 110 by using this relationship. In this manner, the tag communication device 100 can more accurately perform an operation on the RFID tag 200 present at a specific position.

Note that it is sufficient that the imaging region 2 of the imaging unit 120 includes at least a portion of the communicable range 1 of the communication unit 110. That is, as illustrated in FIG. 2, the imaging region 2 may include only a portion of the communicable range 1 or may include the entire communicable range 1.

§ 2 Configuration Example

[Hardware Configuration Example of Tag Communication Device]

Figure 3:
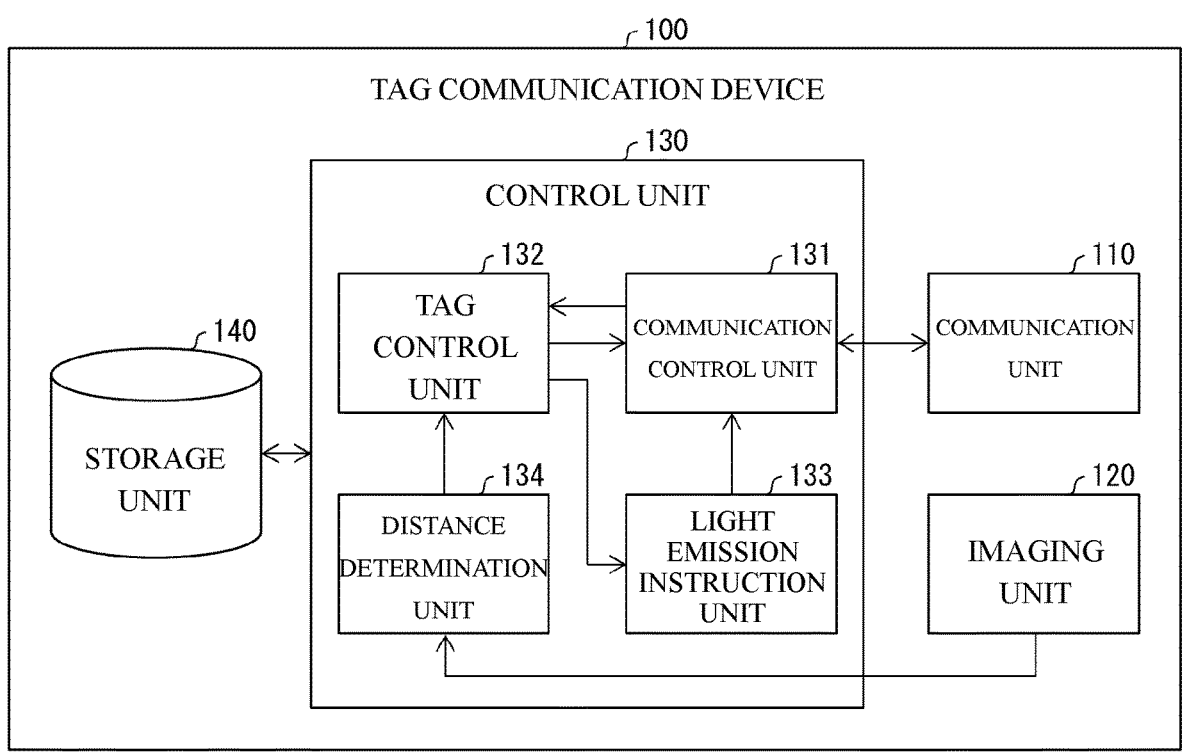
FIG. 3 is a block diagram illustrating a configuration example of main portions of the tag communication device in the embodiment according to the embodiment of the disclosure.

FIG. 3 is a block diagram illustrating a configuration example of main portions of the tag communication device 100. The tag communication device 100 includes the communication unit 110, the imaging unit 120, and the control unit 130. In addition, the tag communication device 100 may include a storage unit 140 in order to make the device itself function.

The communication unit 110 communicates with the RFID tag 200 through electromagnetic waves. The communication unit 110 transmits information received from a communication control unit 131 to the outside as electromagnetic waves, converts the electromagnetic waves received from the outside into information, and transmits the information to the communication control unit 131. Specifically, the communication unit 110 is constituted by an antenna, a resonance circuit, an analog to digital (A/D) conversion circuit, a digital to analog (D/A) conversion circuit, a modulation/demodulation circuit, an RF circuit, or the like.

The imaging unit 120 acquires imaging information. The imaging information acquired by the imaging unit 120 is transmitted to a distance determination unit 134 and is analyzed. Specifically, the imaging unit 120 is constituted by any of various cameras or the like.

The control unit 130 controls the overall processing executed within the tag communication device 100. The control unit 130 is constituted by, for example, a personal computer (PC)-based computer. The control of the processing performed by the tag communication device 100 is performed by causing the computer to execute a control program. This program may be (i) in the form of a program recorded in removable media (CD-ROM or the like), read, and used, may be (ii) in the form of a program installed in a hard disk or the like, read, and used, or may be (iii) in the form of a program downloaded through an external I/F, installed in the hard disk or the like, and executed.

Functional blocks included in the control unit 130 will be described later in a paragraph of a software configuration example.

The storage unit 140 is constituted by a non-volatile storage device (hard disk or the like). Examples of contents stored in the storage unit 140 include the above-described control program, an operating system (OS) program, various other programs, and various data.

[Software Configuration Example of Tag Communication Device]

The control unit 130 includes a communication control unit 131, a tag control unit 132, a light emission instruction unit 133, and a distance determination unit 134.

The communication control unit 131 is a functional block that controls the function of the communication unit 110 and exchanges information with the communication unit 110. The communication control unit 131 transmits information obtained from electromagnetic waves received by the communication unit 110 to other functional blocks. In addition, the communication control unit 131 transmits the information received from other functional blocks to the communication unit 110, converts the information into electromagnetic waves, and transmits the electromagnetic waves.

The tag control unit 132 is a functional block that generates information to be transmitted to the RFID tag 200 and processes information received from the RFID tag 200. As an example, the tag control unit 132 acquires a tag ID (identification) of the RFID tag 200 communicating with the communication unit 110. As another example, the tag control unit 132 generates an instruction with contents for performing a predetermined operation on a specific RFID tag 200 on the basis of determination results transmitted from the distance determination unit 134.

The light emission instruction unit 133 is a functional block that generates an instruction with contents for causing the light emitting unit 220 included in the RFID tag 200 to emit light (hereinafter, referred to as a "light emission instruction") with respect to the RFID tag 200 having a specific tag ID.

The distance determination unit 134 is a functional block that measures a distance between a position where the light emitting unit 220 emits light and the imaging unit 120 (that is, a distance between the RFID tag 200 and the imaging unit 120) and determines whether or not the distance is within a predetermined range.

[Configuration Example of RFID Tag]

A block diagram illustrating a configuration example of main portions of the RFID tag 200 is shown on the right side in FIG. 1. As shown in the drawing, the RFID tag 200 includes the communication unit 210, the light emitting unit 220, a control unit 230, and a storage unit 240.

The communication unit 210 communicates with the tag communication device 100 through electromagnetic waves. The communication unit 210 transmits information received from the control unit 230 to the outside as electromagnetic waves, converts the electromagnetic waves received from the outside into information, and transmits the information to the control unit 230. Further, in a case where the RFID tag 200 itself is a passive RFID tag not having its own power supply, the communication unit 210 plays a role of receiving supply of power for operating the control unit 230. Specifically, the communication unit 210 is constituted by an antenna, a resonance circuit, a modulation/demodulation circuit, an RF circuit, or the like.

The light emitting unit 220 receives a light emission instruction transmitted from the tag communication device 100 to emit light. In more detail, the light emitting unit 220 receives the light emission instruction transmitted from the tag communication device 100 through the communication unit 210 and then receives a command from the control unit 230 to emit light. Specifically, the light emitting unit 220 is constituted by any of various light emitting elements or the like.

The control unit 230 controls the overall processing executed within the RFID tag 200. The control unit 230 includes a logical operation circuit, a register, and the like and functions as a computer. The control of the processing performed by the RFID tag 200 is performed by causing the computer to execute a control program. For example, this program may be (i) in the form of a program installed in a read only memory (ROM) of the storage unit 240 or the like, read, and used, or may be (ii) in the form of a program downloaded from the tag communication device 100 through the communication unit 210, installed in the storage unit 240, and executed.

In addition, the control unit 230 stores information received from the tag communication device 100 in the storage unit 240 on the basis of information received from the tag communication device 100 through the communication unit 210. Further, the control unit 230 reads out the information stored in the storage unit 240, transmits the information to the tag communication device 100 through the communication unit 210, and causes the light emitting unit 220 to emit light.

The storage unit 240 is constituted by a semiconductor memory such as the above-described ROM, a static RAM (SRAM), a ferroelectric memory (FeRAM) or the like. Examples of the information stored in the storage unit 240 include the above-described control program, various other programs, and various data.

§ 3 Processing Example

A processing example of the tag communication device 100 will be described on the basis of a flow diagram of FIG. 4. Note that a processing procedure to be described below is just an example, and each processing may be changed as much as possible. In addition, the omission, replacement, and addition of steps can be appropriately performed on the processing procedure to be described below in accordance with an embodiment.

Figure 4:
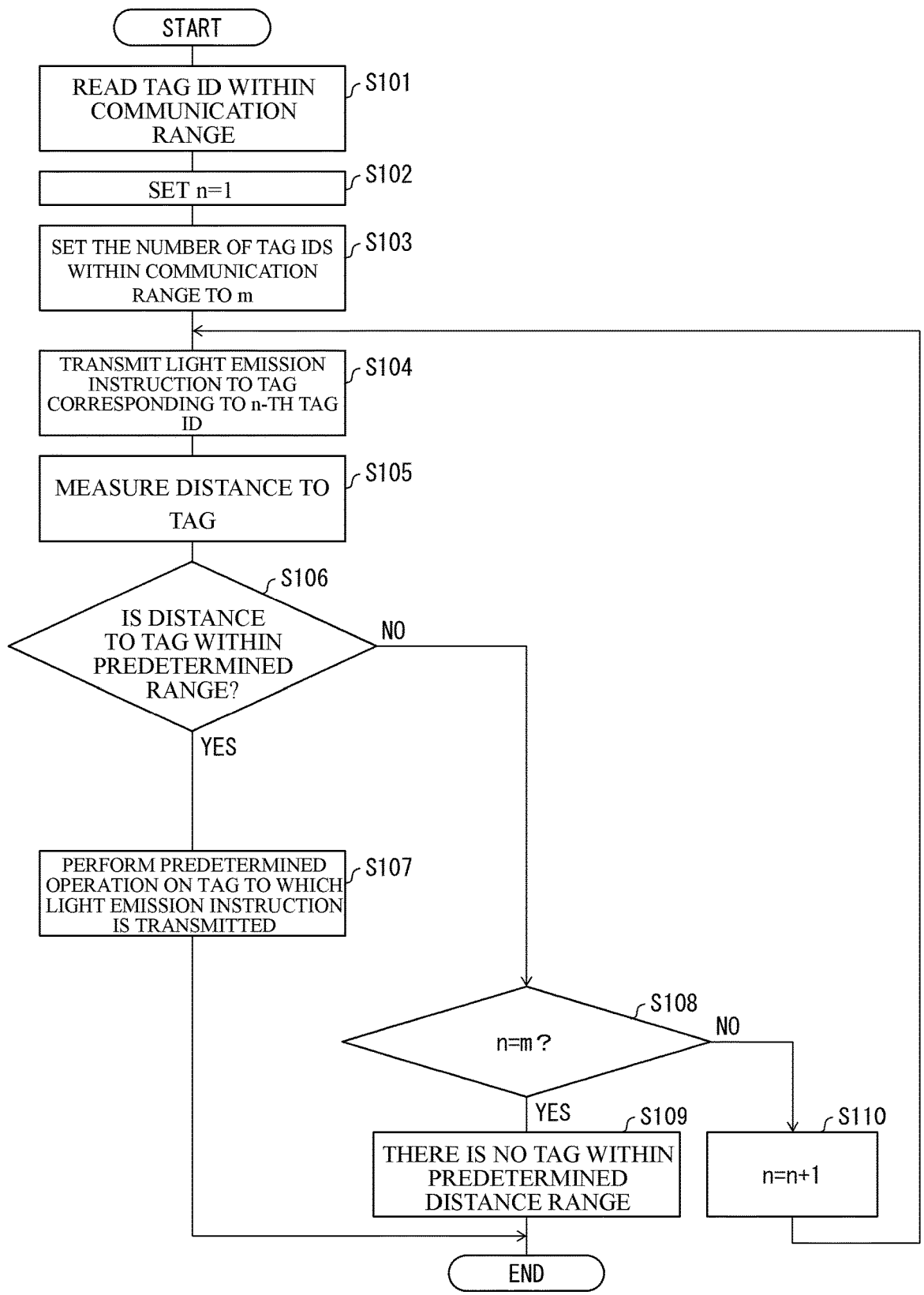
FIG. 4 is a flow diagram illustrating a processing example of the tag communication device in the embodiment according to the embodiment of the disclosure.

Schematically, in the flow diagram of FIG. 4, when one RFID tag 200 a distance away from the imaging unit 120 within a predetermined range is detected, a predetermined operation is performed on the RFID tag 200 to complete processing. Therefore, it is preferable that the processing example illustrated in FIG. 4 be used for a tag communication system in which the number of RFID tags 200 that may be included in a predetermined distance range from the imaging unit 120 is a maximum of one. Such a tag communication system can be realized, for example, by appropriately adjusting a disposition interval between RFID tags 200. More specifically, this processing example is suitably applied to a case where an interval between RFID tags 200 is provided on a production line and the RFID tags 200 flow with an amount of distribution such that only one RFID tag 200 is included within the predetermined distance range.

(S101)

In S101, the tag communication device 100 reads a tag ID within a communicable range. In more detail, this step is executed by the following sub-steps.

(i) The communication control unit 131 causes the communication unit 110 to communicate with the RFID tag 200 capable of communicating with the communication unit 110.

(ii) The communication control unit 131 receives information related to the RFID tag 200 that has communicated with the communication unit 110 in (i) from the communication unit 110 and transmits the information to the tag control unit 132.

(iii) The tag control unit 132 acquires a tag ID of the RFID tag 200 that has communicated with the communication unit 110 in (i) on the basis of the information received in (ii).

S101 corresponds to "an acquisition process/an acquisition step" of the disclosure.

(S102)

In S102, n is changed to n=1. Here, n is a parameter for causing the control unit 130 to perform processing on an n-th tag ID. Therefore, S102 is a step of resetting this parameter so as to start processing from a first tag ID.

(S103)

In S103, the number of tag IDs within a communication range is obtained. This step is executed by obtaining the number of tag IDs acquired in S101 by the tag control unit 132. For the following description, the number of tag IDs obtained in S103 is set to m.

(S104)

In S104, a light emission instruction is transmitted to an RFID tag 200 corresponding to the n-th tag ID. Here, in a case where the operation transitions from S103 to S104, n=1. On the other hand, in a case where the operation transitions from S110 to S104, n is determined in S110 (to be described later). In more detail, this step is executed by the following sub-steps.

(i) The tag control unit 132 transmits the n-th tag ID to the light emission instruction unit 133.
(ii) The light emission instruction unit 133 generates an instruction with contents for causing the light emitting unit 220 included in the RFID tag 200 to emit light (light emission instruction) with respect to the RFID tag 200 corresponding to the n-th tag ID.
(iii) The generated light emission instruction is transmitted through the communication control unit 131 and the communication unit 110.

S104 corresponds to "a transmission process/a transmission step" of the disclosure.

After S104, the RFID tag 200 having received the transmitted light emission instruction causes the light emitting unit 220 to emit light. In this case, the light emitting unit 220 of the above-described "RFID tag 200 corresponding to the n-th tag ID" emits light.

(S105)

In S105, the distance determination unit 134 measures a distance between a position where the light emitting unit 220 emits light based on the light emission instruction and the imaging unit 120 on the basis of imaging information received from the imaging unit 120. A specific example of a distance measurement method will be described later.

S105 corresponds to "a measurement process/a measurement step" of the disclosure.

(S106)

In S106, the distance determination unit 134 determines whether or not the distance measured in S105 is within a predetermined range. A determination result is transmitted to the tag control unit 132. In addition, the operation proceeds to S107 in a case where it is determined that the distance is within the predetermined range, and the operation proceeds to S108 in a case where it is determined that the distance falls outside the predetermined range.

(S107)

In S107, a predetermined operation is performed on the RFID tag 200 having transmitted the light emission instruction in S104. In more detail, this step is executed by the following sub-steps. (i) The tag control unit 132 generates an instruction with contents for performing the predetermined operation on the RFID tag 200 having transmitted the light emission instruction in S104 (that is, the RFID tag 200 corresponding to the n-th tag ID).

(ii) The instruction generated in (i) is transmitted to the RFID tag 200 through the communication control unit 131 and the communication unit 110. In an example, the RFID tag 200 writes information in the storage unit 240 on the basis of the instruction. In another example, the RFID tag 200 reads out the information from the storage unit 240 on the basis of the instruction and transmits the information through the communication unit 210.

S106 and S107 correspond to "an operation process/an operation step" of the disclosure.

(S108)

In S108, it is determined whether or not n=m. In more detail, the tag control unit 132 determines whether or not the value of n given in S104 is equal to the value of m obtained in S103. A case of n=m is a case where (i) a light emission instruction is transmitted to all of m RFID tags 200 corresponding to m tag IDs and (ii) the light emission of the light emitting unit 220 based on the light emission instruction has not been detected within a predetermined distance range from the imaging unit 120. In this case, the operation proceeds to S109. On the other hand, a case of n≠m is a case where there are RFID tags 200 to which the light emission instruction has not been transmitted among the m RFID tags 200 corresponding to the m tag IDs. In this case, the operation proceeds to S110.

(S109)

In S109, the tag control unit 132 determines that there are no RFID tags 200 within the predetermined distance range from the imaging unit 120 and terminates the processing. This step corresponds to a case where there is an RFID tag 200 in a range in which the RFID tag 200 can communicate with the communication unit 110 but there is no RFID tag 200 within the predetermined distance range from the imaging unit 120. In an example, this situation corresponds to a situation where the communication unit 110 and an RFID tag 200 outside the predetermined distance range from the imaging unit 120 have communicated with each other. Even in such a case, the tag communication device 100 does not perform any operation on an RFID tag 200 which is not present at a specific position.

(S110)

In S110, the tag control unit 132 proceeds to S104 with the relation of n=n+1. That is, although the processing for the n-th tag ID has been performed in the routine so far, the tag control unit 132 changes parameters so that processing for an n+1-th tag ID is performed.

[Distance Measurement Method]

As described above, in S105, the distance determination unit 134 measures a distance between a position where the light emitting unit 220 emits light based on a light emission instruction and the imaging unit 120 on the basis of imaging information received from the imaging unit. A distance measurement method is not particularly limited. As an example, (i) a distance measurement method characterized by the imaging unit 120 and (ii) a distance measurement method characterized by the light emitting unit 220 will be described below.

An example of the distance measurement method characterized by the imaging unit 120 is a method adopting a stereo camera as the imaging unit 120. In this case, the distance determination unit 134 measures a distance between a position where the light emitting unit 220 emits light based on a light emission instruction and the imaging unit 120 on the basis of a plurality of parallax images acquired by the imaging unit 120. Another example of the distance measurement method characterized by the imaging unit 120 is a method adopting a camera having an auto-focus function as the imaging unit 120. The imaging unit 120 performs imaging by focusing on a position where the light emitting unit 220 emits light. The imaging unit 120 outputs information on a distance from the imaging unit 120 to a focus position to the distance determination unit 134 as imaging information. The distance determination unit 134 measures a distance between a position where the light emitting unit 220 emits light based on a light emission instruction and the imaging unit 120 with reference to the imaging information. In either case, a known technique in an optical equipment field can be appropriately used.

An example of the distance measurement method characterized by the light emitting unit 220 is a method of measuring a distance between a position where the light emitting unit 220 emits light based on a light emission instruction and the imaging unit 120 on the basis of the size of the light emitting unit 220 in an image acquired by the imaging unit 120. This method is a method of measuring a distance using a phenomenon in which the light emitting unit 220 in an image acquired by the imaging unit 120 becomes smaller as a distance between the light emitting unit 220 and the imaging unit 120 increases.

Figure 5:
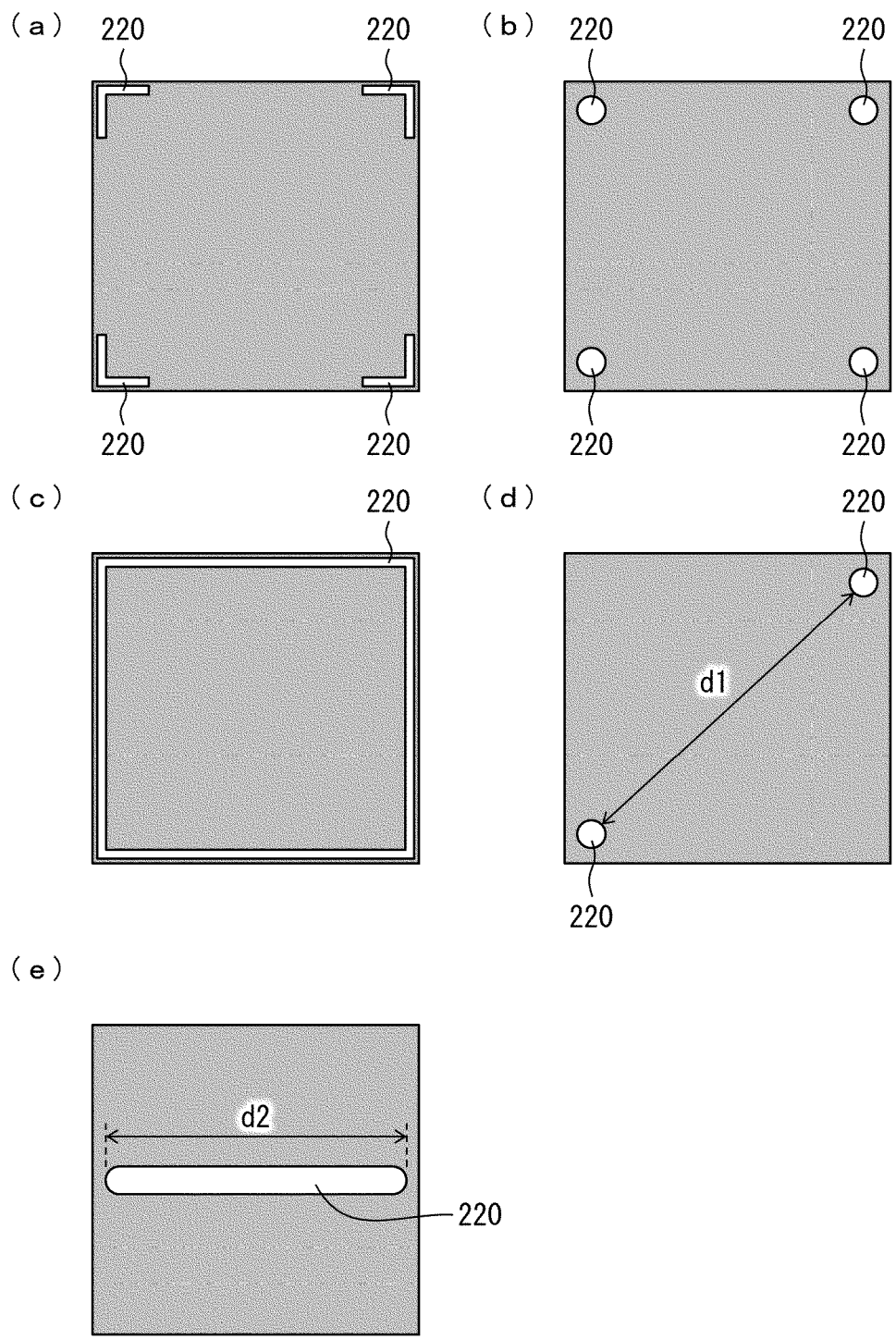
FIG. 5 illustrates an example of arrangement of a light emitting unit of an RFID tag in the embodiment according to the embodiment of the disclosure.

FIG. 5 illustrates an example of arrangement of the light emitting unit 220 suitable for the measurement of a size in an image with respect to the above-described distance measurement method. In part (a) and part (b) of FIG. 5, the light emitting unit 220 is disposed at each of corners of a specific shape (a square shape in FIG. 5). In part (c) of FIG. 5, the light emitting unit 220 is disposed at the contour of a specific shape (a square shape in FIG. 5). When the light emitting unit 220 is disposed as illustrated in part (a) to part (c), for example, an area of a specific shape specified by the light emitting unit 220 can be regarded as "the size of the light emitting unit 220". Further, in part (d), two light emitting units 220 are disposed with a predetermined interval d1. In part (e), a segment-like light emitting unit 220 having a length of d2 is provided. When the light emitting unit 220 is disposed as illustrated in part (d) and part (e), for example, it is possible to determine "the size of the light emitting unit 220" by comparing a distance between two points or the length of a segment in an image with d1 or d2.

§ 4 Modification Example

Although the embodiment of the disclosure has been described above in detail, the above description is merely illustrative of the disclosure in all respects. It is needless to say that various improvements and modifications can be made without departing from the scope of the disclosure. For example, the following changes can be made. Note that, hereinafter, the same components as those in the embodiment will be denoted by the same reference numerals and signs, and description of the same points as those in the embodiment will be omitted as appropriate. The following modification examples can be combined with each other as appropriate.

[4-1]

In the processing example described in § 3, light emission instructions are transmitted in order one by one to the RFID tag 200 having performed communication in S101 while going through a routine of S104→S105→ S106→ S108→S110→S104. However, this light emission instruction may be simultaneously transmitted to two or more RFID tags 200. In this case, when a light emission instruction is transmitted so as to make two or more RFID tags 200 emit light at different timings, it is possible to distinguish the two or more RFID tags 200 from each other, which leads to a preferable result.

In order to simultaneously transmit a light emission instruction to two or more RFID tags 200 and to make the two or more RFID tags 200 emit light at different timings, for example, a light emission timing may be designated by the light emission instruction. As a specific example, it is possible to make two RFID tags emit light at different timings when the tag communication device 100 transmits a light emission instruction having contents for making an RFID tag having a tag ID "0001" emit light after one to two seconds and making an RFID tag having a tag ID "0002" emit light after two to three seconds on the basis of a transmission time of the light emission instruction.

[4-2]

Figure 6:
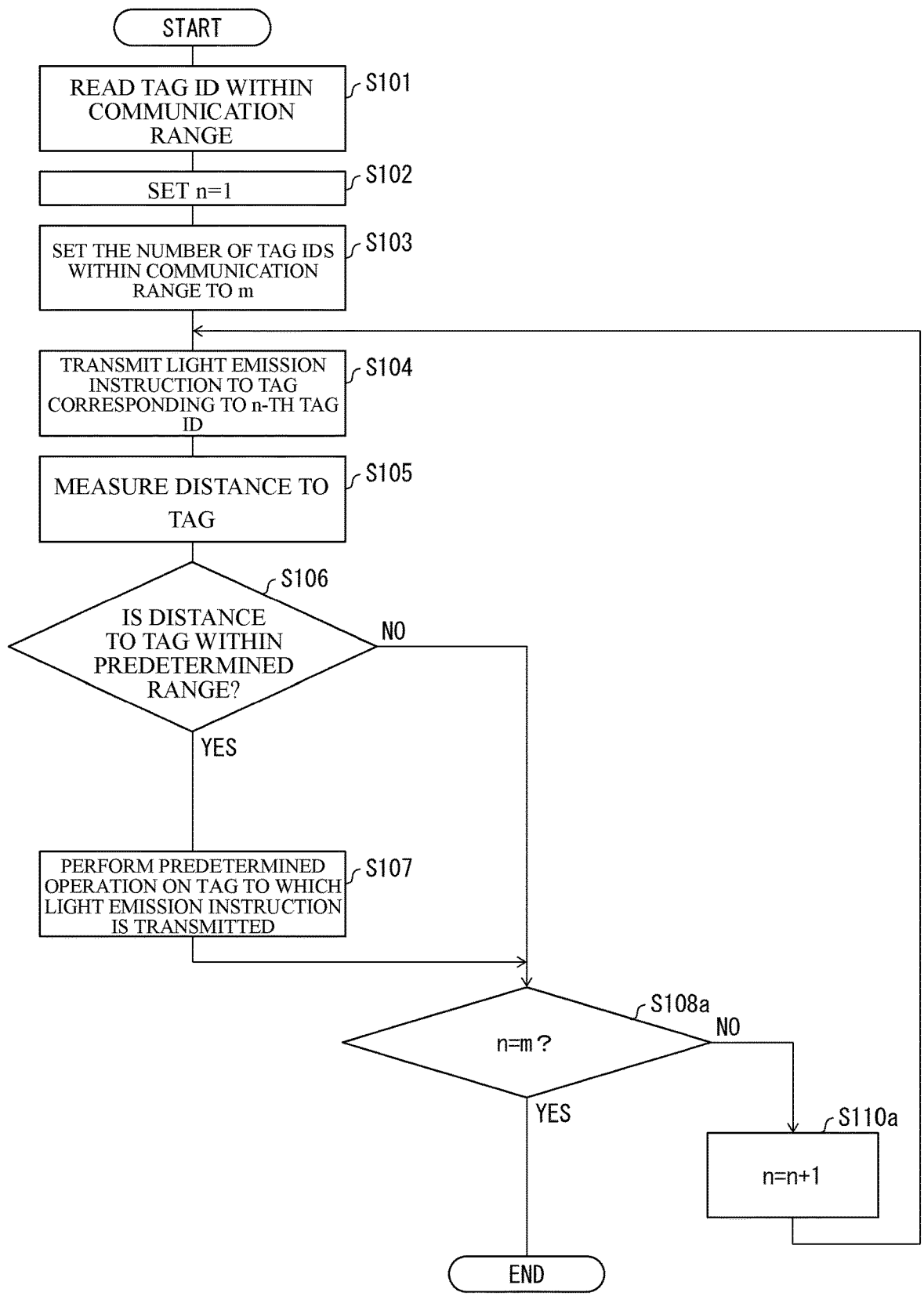
FIG. 6 is a flow diagram showing a processing example of a tag communication device in a modification example (4-2) of the disclosure.

A modification example of the processing example of the tag communication device 100 described in FIG. 4 will be described on the basis of FIG. 6. A flow diagram of FIG. 6 is different from the flow diagram of FIG. 4 in that the operation proceeds to S108a in which it is determined whether or not n=m after S107. Note that the processes of S101 to S107 are as described in § 3.

In a case where n=m in S108a (in a case where the transmission of a light emission instruction to all of m RFID tags 200 has been terminated), the tag control unit 132 terminates the processing. On the other hand, in a case where n≠m (there is an RFID tag 200 to which a light emission instruction has not been transmitted), the operation proceeds to S110a. In S110a, the processing proceeds to S104 with the relation of n=n+1 (the processing of S110a is the same as S110 described above).

Schematically, in the flow diagram of FIG. 6, the transmission of a light emission instruction is continued even when the communication unit 110 can communicate with two or more RFID tags 200 and light emitted from one RFID tag 200 within a predetermined range from the imaging unit 120 is detected. Here, in a case where light emission of the light emitting unit 220 based on a light emission instruction is detected a plurality of times within a predetermined distance range from the imaging unit 120, a predetermined operation is performed on an RFID tag 200 including each light emitting unit 220. Therefore, it is preferable that the processing example as illustrated in FIG. 6 be used for a tag communication system in which the number of RFID tags 200 that may be included within a predetermined distance range from the imaging unit 120 is a maximum of two or more. Such a tag communication system can be realized, for example, by appropriately adjusting an arrangement interval between RFID tags 200. More specifically, this processing example is suitably applied in a case where an interval between RFID tags 200 on a production line is reduced so that an interval between RFID tags 200 becomes sufficiently smaller than the predetermined distance range and two or more RFID tags 200 may be included within the predetermined distance range.

Note that it may be determined whether or not n=m' instead of determining whether or not n=m in S108a (here, m' is an integer satisfying the relation of 2≤m'≤m). That is, in the present modification example, it is not necessary to transmit a light emission instruction to all of the tag IDs acquired in S101.

[4-3-1]

A modification example for setting two or more sub-ranges will be described on the basis of FIG. 7. In the present modification example, two or more sub-ranges are set within a predetermined range, and it is determined in which sub-range a distance between the imaging unit 120 and the light emitting unit 220 is included. The tag communication device 100 performs a different operation on the RFID tag 200 depending on in which sub-range a distance between the imaging unit 120 and the light emitting unit 220 is included.

Figure 7:
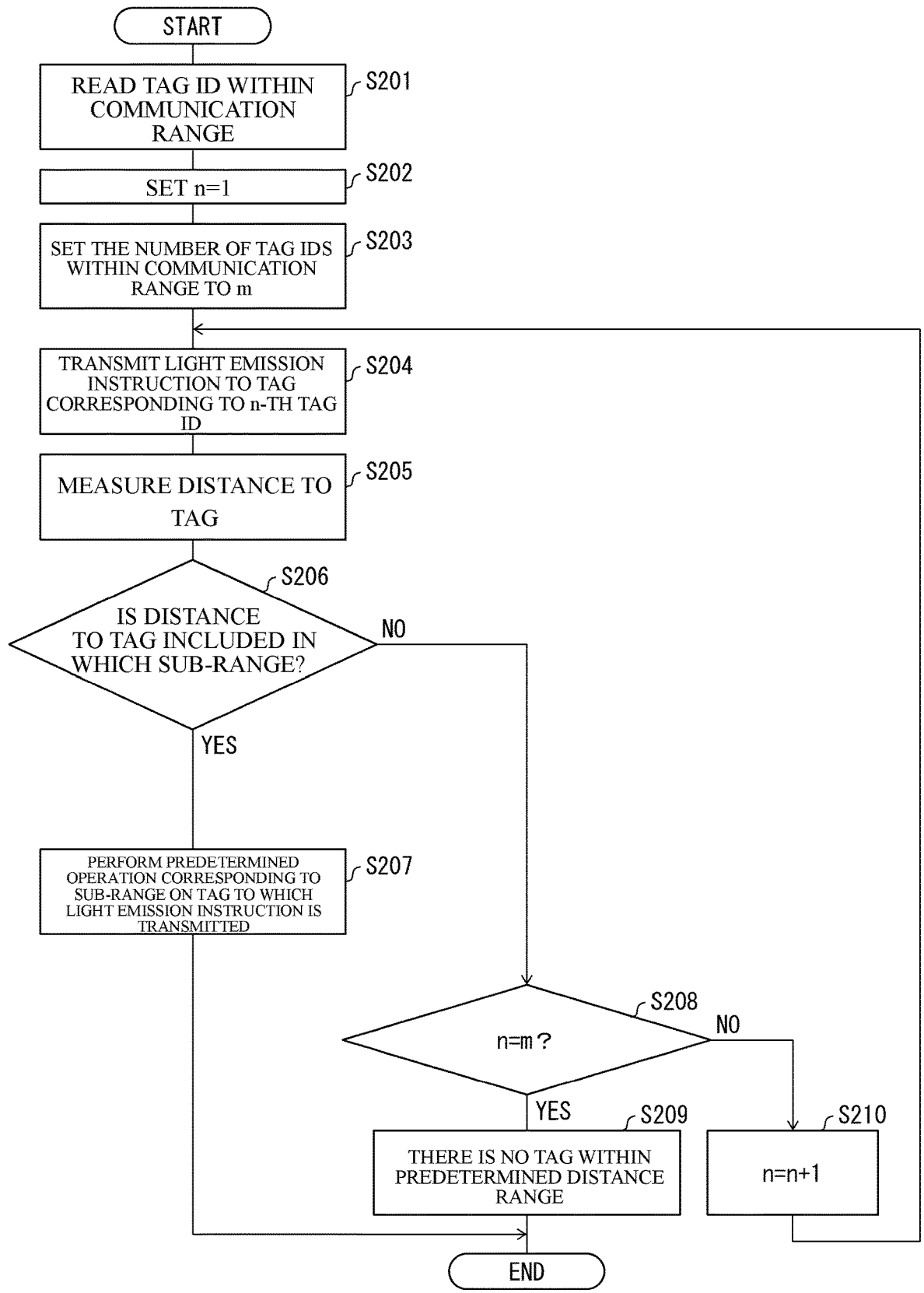
FIG. 7 is a flow diagram showing a processing example of a tag communication device in a modification example (4-3-1) of the disclosure.

In a flow diagram of FIG. 7, when light emission of the light emitting unit 220 is detected once, a predetermined operation is performed on the RFID tag 200 including the light emitting unit 220, and the processing is completed, similar to the flow diagram of FIG. 4. Therefore, it is preferable that the processing example illustrated in FIG. 7 be used for a tag communication system in which (i) a distance between the imaging unit 120 and the RFID tag 200 is classified into two or more groups and (ii) the number of RFID tags 200 that may be included within a predetermined distance range from the imaging unit 120 is a maximum of one. As a specific example, the processing example is suitably applied to a case where the RFID tags 200 flow (i) on two production lines having different distances from the imaging unit 120 with an amount of distribution such that only a maximum of one RFID tag 200 is included within a predetermined range from the imaging unit 120.

(S206)

In S206, it is determined in which sub-range a distance between the imaging unit 120 and the light emitting unit 220 is included. In more detail, this step is executed by the following sub-steps.

(i) The distance determination unit 134 determines whether or not the distance measured in S205 is within a predetermined range. This sub-step is the same as S106 described in § 3.

(ii) In a case where it is determined in (i) that "the distance is within the predetermined range", the distance determination unit 134 determines in which sub-range the distance is included. For example, it is assumed that the predetermined distance is "5 m to 20 m from the imaging unit 120", a sub-range A is "5 m to 10 m from the imaging unit 120", and a sub-range B is "10 m to 20 m from the imaging unit 120". In this case, the light emitting unit 220 having a distance from the imaging unit 120 being 8 m is included in the sub-range A. On the other hand, the light emitting unit 220 having a distance from the imaging unit 120 being 14 m is included in the sub-range B.

(iii) The determination results in (i) and (ii) are transmitted to the tag control unit 132. In addition, the operation proceeds to S207 in a case where it is determined in (i) that the distance is within the predetermined range, and the operation proceeds to S208 in a case where it is determined that the distance falls outside the predetermined range.

(S207)

In S207, a predetermined operation is performed on the RFID tag 200 on the basis of the determination result in S206. In this case, the tag control unit 132 performs a different operation in response to the determination result in (ii) of S206. In this manner, the tag communication device 100 can perform different operations on RFID tags 200 having different distances from the imaging unit 120. As a specific example, an operation of "writing information A" can be performed on an RFID tag 200 flowing through a production line A, and an operation of "writing information B" can be performed on an RFID tag 200 flowing through a production line B.

Note that the processes of S201 to S205 and S208 to S210 are the same as the processes of S101 to S105 and S108 to S110 described in § 3, and thus the description thereof is omitted.

[4-3-2]

Figure 8:
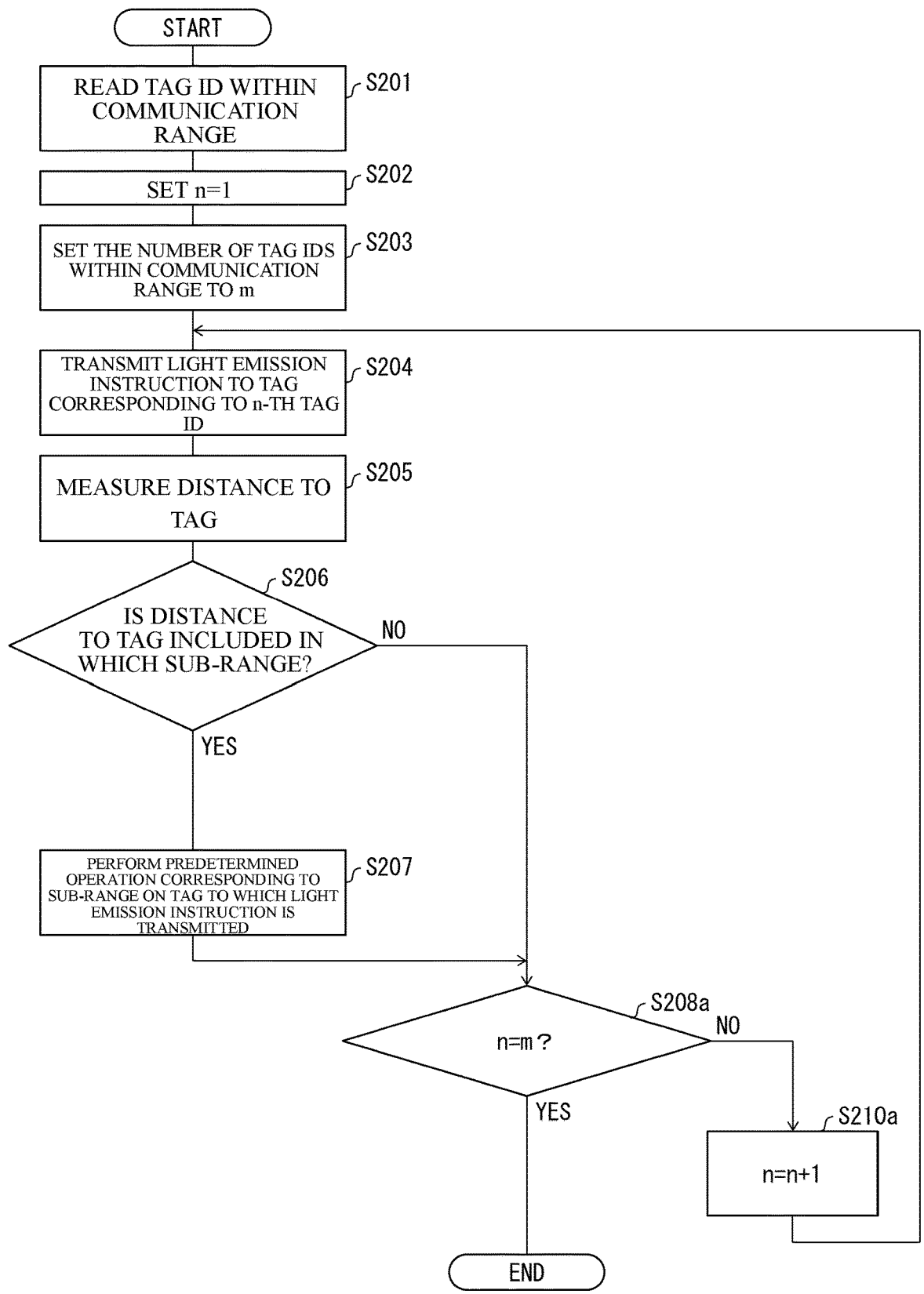
FIG. 8 is a flow diagram showing a processing example of a tag communication device in a modification example (4-3-2) of the disclosure.

A modification example of the processing example of the tag communication device 100 described in FIG. 7 will be described on the basis of FIG. 8. A flow diagram of FIG. 8 is different from the flow diagram of FIG. 7 in that the operation proceeds to S208a in which it is determined whether or not n=m after S207. The flow diagram of FIG. 8 is a flow diagram in which the processing of "the transmission of a light emission instruction is continued even when the communication unit 110 can communicate with two or more RFID tags 200 and light emitted from one RFID tag 200 within a predetermined range from the imaging unit 120 is detected" described in [4-2] is applied to the flow diagram of FIG. 7. Therefore, it is preferable that the processing example as illustrated in FIG. 8 be used for a tag communication system in which (i) a distance between the imaging unit 120 and the RFID tag 200 is classified into two or more groups and (ii) the number of RFID tags 200 that may be included within a predetermined distance range from the imaging unit 120 is a maximum of two or more. As a specific example, the processing example is suitably applied to a case where the RFID tags 200 flow (i) on two production lines having different distances from the imaging unit 120 (ii) with an amount of distribution such that two or more RFID tags 200 are included within a predetermined range from the imaging unit 120.

Note that it may be determined whether or not n=m' instead of determining whether or not n=m in S208a (here, m' is an integer satisfying the relation of 2≤m'≤m). That is, in the present modification example, it is not necessary to transmit a light emission instruction to all of the tag IDs acquired in S201.

[4-4]

A modification example for preferentially transmitting a light emission instruction to an RFID tag 200 having the intensity of a predetermined electromagnetic wave signal will be described on the basis of FIG. 9. In the present modification example, the tag control unit 132 generates data having a configuration illustrated in FIG. 9. This data is data in which a tag ID and the intensity of an electromagnetic wave signal received (displayed as RSSI in FIG. 9) are associated with each other, with respect to each RFID tag 200 capable of communicating with the communication unit 110.

In general, the intensity of an electromagnetic wave signal decreases as a distance from a generation source of the electromagnetic wave signal increases. By using this phenomenon, it is possible to associate the intensity of the predetermined electromagnetic wave signal with a specific position. In FIG. 9, it is estimated that RFID tags 200 respectively having tag IDs "0005" and "0002" in which RSSI is in a range from −15 to −25 are on a production line A. Similarly, it is estimated that RFID tags 200 respectively having tag IDs "0008" and "0001" are on a production line B. In addition, it is estimated that RFID tags 200 respectively having tag IDs "0007" and "0003" are on a production line C.

Naturally, the fact that it is difficult to measure a distance on the basis of only an electromagnetic wave signal because the intensity of an electromagnetic wave signal may vary due to various factors is as described in the summary of the disclosure. However, a possibility that the processing speed of the tag communication device 100 is increased by narrowing down "candidates of RFID tags 200 estimated to be on a specific production line" on the basis of the intensity of an electromagnetic wave signal and preferentially transmitting a light emission instruction to the RFID tags increases.

For example, in a case where the data of FIG. 9 is obtained and an operation is desired to be performed on the RFID tag 200 on the production line A, a possibility that the processing proceeds more efficiently increases by selecting RFID tags 200 to which first and second light emission instructions are to be transmitted first and second, from the RFID tag 200 having a tag ID "0005" or "0002". For the same reasoning, when an RFID tag to which a third light emission instruction is to be transmitted is set to be an RFID tag 200 having a tag ID "0000" which is closest to RSSI (−15 to −25) corresponding to the production line A, a possibility that the processing proceeds more efficiently increases.

That is, in the present modification example, a distance of the RFID tag 200 is "guessed" on the basis of the intensity of an electromagnetic wave signal. In addition, a light emission instruction is transmitted in an earlier order to RFID tags 200 estimated to be in a specific distance range on the basis of the result.

[Example of Realization by Software]

The control blocks of the tag communication device 100 (particularly, the control unit 130, the communication control unit 131, the tag control unit 132, the light emission instruction unit 133, and the distance determination unit 134) may be realized by a logic circuit (hardware) formed in an integrated circuit (IC chip) or the like or may be realized by software.

In the latter case, the tag communication device 100 includes a computer executing a command of a program which is software for realizing each function. The computer includes, for example, one or more processors and includes a computer-readable recording medium storing the program. Further, in the computer, the embodiment of the disclosure is accomplished by reading the program from the storage medium and executing the program by the processor. As the processor, for example, a central processing unit (CPU) can be used. As the storage medium, "a non-transitory tangible medium", for example, a tape, a disk, a card, a semiconductor memory, a programmable logic circuit, and the like can be used in addition to a read only memory (ROM) and the like. In addition, the computer may further include a random access memory (RAM) developing the program, and the like. In addition, the program may be supplied to the computer through any transmission medium capable of transmitting the program (a communication network, broadcast waves, or the like). Note that an embodiment of the disclosure may also be realized in the form of a data signal embedded into carrier waves in which the program is embodied by electronic transmission.

The disclosure is not limited to the above-described embodiments, and various modifications can be made within the scope recited in the claims. An embodiment obtained by appropriately combining technical means disclosed in different embodiments is also included in the technical scope of the disclosure.

What is claimed is:

1. A tag communication device performing wireless communication with a radio frequency identifier (RFID) tag comprising a light emitting unit, the tag communication device comprising:
    a communication unit that performs wireless communication with the RFID tag;
    an imaging unit that images at least a portion of a communicable range of the communication unit; and
    a control unit,
    wherein the control unit performs
    an acquisition process of acquiring tag identifications (IDs) of one or more RFID tags, which are present in the communicable range of the communication unit, through the communication unit,
    a transmission process of transmitting a light emission instruction to at least some of the RFID tags corresponding to the acquired tag IDs through the communication unit,
    a measurement process of measuring a distance between the imaging unit and a position where the light emitting unit emits light based on the light emission instruction, on the basis of imaging information of the imaging unit, and
    an operation process of performing a predetermined operation on an RFID tag to which the light emission instruction is transmitted through the communication unit in a case where it is determined that the distance is within a predetermined rang;
    wherein the control unit
    sets two or more sub-ranges within the predetermined range in the operation process, and
    performs a different operation on the RFID tag to which the light emission instruction is transmitted depending on in which sub-range the distance between the imaging unit and the position where the light emitting unit emits light based on the light emission instruction is included, in the operation process.

2. The tag communication device according to claim 1, wherein the control unit measures the distance between the imaging unit and the position where the light emitting unit emits light based on the light emission instruction, on the basis of a size of the light emitting unit in an image acquired by the imaging unit in the measurement process.

3. The tag communication device according to claim 1, wherein the imaging unit is a stereo camera, and the control unit measures the distance between the imaging unit and the position where the light emitting unit emits light based on the light emission instruction, on the basis of a plurality of parallax images acquired by the imaging unit in the measurement process.

4. The tag communication device according to claim 1, wherein the control unit transmits a light emission instruction to an RFID tag in which an intensity of an electromagnetic wave signal is within a predetermined range, among the RFID tags corresponding to the acquired tag IDs in the transmission process.

5. The tag communication device according to claim 1, wherein the control unit transmits a light emission instruction so as to make two or more RFID tags emit light at different timings in a case where the light emission instruction is transmitted to the two or more RFID tags in the transmission process.

6. The tag communication device according to claim 1, wherein in a case where (i) tag IDs of two or more RFID tags are acquired and (ii) it is determined that the distance is within the predetermined range with respect to one RFID tag among the two or more RFID tags in the operation process, the control unit continuously transmits a light emission instruction to the remaining RFID tags among the two or more RFID tags in the transmission process.

7. The tag communication device according to claim 1, wherein the predetermined operation in the operation process is at least one of the following (i) and (ii):
    (i) reading out information from the RFID tag with respect to the RFID tag to which the light emission instruction is transmitted, and
    (ii) writing information in the RFID tag with respect to the RFID tag to which the light emission instruction is transmitted.

8. A non-transitory computer-readable recording medium, comprising a tag communication control program for causing a computer to function as the tag communication device according to claim 1, the tag communication control program causing the computer to function as the control unit.

9. The tag communication device according to claim 1, wherein the control unit measures the distance between the imaging unit and the position where the light emitting unit emits light based on the light emission instruction, on the basis of a size of the light emitting unit in an image acquired by the imaging unit in the measurement process.

10. The tag communication device according to claim 1, wherein the imaging unit is a stereo camera, and
the control unit measures the distance between the imaging unit and the position where the light emitting unit emits light based on the light emission instruction, on the basis of a plurality of parallax images acquired by the imaging unit in the measurement process.

11. The tag communication device according to claim 1, wherein the control unit transmits a light emission instruction to an RFID tag in which an intensity of an electromagnetic wave signal is within a predetermined range, among the RFID tags corresponding to the acquired tag IDs in the transmission process.

12. The tag communication device according to claim 2, wherein the control unit transmits a light emission instruction to an RFID tag in which an intensity of an electromagnetic wave signal is within a predetermined range, among the RFID tags corresponding to the acquired tag IDs in the transmission process.

13. The tag communication device according to claim 3, wherein the control unit transmits a light emission instruction to an RFID tag in which an intensity of an electromagnetic wave signal is within a predetermined range, among the RFID tags corresponding to the acquired tag IDs in the transmission process.

14. The tag communication device according to claim 1, wherein the control unit transmits a light emission instruction so as to make two or more RFID tags emit light at different timings in a case where the light emission instruction is transmitted to the two or more RFID tags in the transmission process.

15. The tag communication device according to claim 2, wherein the control unit transmits a light emission instruction so as to make two or more RFID tags emit light at different timings in a case where the light emission instruction is transmitted to the two or more RFID tags in the transmission process.

16. The tag communication device according to claim 3, wherein the control unit transmits a light emission instruction so as to make two or more RFID tags emit light at different timings in a case where the light emission instruction is transmitted to the two or more RFID tags in the transmission process.

17. The tag communication device according to claim 4, wherein the control unit transmits a light emission instruction so as to make two or more RFID tags emit light at different timings in a case where the light emission instruction is transmitted to the two or more RFID tags in the transmission process.

18. The tag communication device according to claim 1, wherein in a case where (i) tag IDs of two or more RFID tags are acquired and (ii) it is determined that the distance is within the predetermined range with respect to one RFID tag among the two or more RFID tags in the operation process, the control unit continuously transmits a light emission instruction to the remaining RFID tags among the two or more RFID tags in the transmission process.

19. A method of controlling a tag communication device including a communication unit and an imaging unit and performing wireless communication with an RFID tag comprising a light emitting unit,
wherein the communication unit performs wireless communication with the RFID tag, and the imaging unit images at least a portion of a communicable range of the communication unit, and
the method comprises:
an acquisition step of acquiring tag IDs of one or more RFID tags, which are present in the communicable range of the communication unit, through the communication unit;
a transmission step of transmitting a light emission instruction to at least some of the RFID tags corresponding to the acquired tag IDs through the communication unit;
a measurement step of measuring a distance between the imaging unit and a position where the light emitting unit emits light based on the light emission instruction, on the basis of imaging information of the imaging unit; and
an operation step of performing a predetermined operation on an RFID tag to which the light emission instruction is transmitted through the communication unit in a case where it is determined that the distance is within a predetermined range
wherein the operation step comprises:
setting two or more sub-ranges within the predetermined range, and
performing a different operation on the RFID tag to which the light emission instruction is transmitted depending on in which sub-range the distance between the imaging unit and the position where the light emitting unit emits light based on the light emission instruction is included.

* * * * *